United States Patent [19]

Meri

[11] 4,079,200
[45] Mar. 14, 1978

[54] APPARATUS FOR RECORDING REPLIES TO PRE-RECORDED MESSAGES

[75] Inventor: Kalju Meri, Maspeth, N.Y.
[73] Assignee: Dictaphone Corporation, Rye, N.Y.
[21] Appl. No.: 649,999
[22] Filed: Jan. 19, 1976
[51] Int. Cl.² ............................................. H04M 1/64
[52] U.S. Cl. ............................ 179/6 R; 179/100.1 VC
[58] Field of Search ......... 179/100.1 VC, 6 R, 1 VC; 360/62, 69; 35/35 C

[56] References Cited

U.S. PATENT DOCUMENTS

| | | | |
|---|---|---|---|
| 3,330,912 | 7/1967 | Koseki | 179/1 VC |
| 3,721,774 | 3/1973 | Yonemoto | 179/100.1 VC |
| 3,865,986 | 2/1975 | Darwood | 179/100.1 VC |
| 3,935,390 | 1/1976 | Winterhalter | 179/100.1 VC |

FOREIGN PATENT DOCUMENTS

| 249,961 | 3/1963 | Australia | 179/100.1 VC |
|---|---|---|---|

*Primary Examiner*—Bernard Konick
*Assistant Examiner*—Alan Faber
*Attorney, Agent, or Firm*—Arthur V. Smith

[57] ABSTRACT

Magnetic recording/playback apparatus for playing back pre-recorded messages and for recording replies to such messages, finding particular application as an unattended telephone message recording device. Successive ones of the pre-recorded messages are separated by detectable indicia. A playback transducer is provided to reproduce the pre-recorded messages and a recording transducer is provided to record the replies to such pre-recorded messages. A detector coupled to the playback transducer detects the indicia and a sensor in communication with the recording transducer senses when a reply to a pre-recorded message has terminated. Switching devices are provided to switch the apparatus from a playback mode to a recording mode when the indicia are detected and for switching the apparatus from the recording mode to the playback mode when the end of a reply is sensed.

3 Claims, 1 Drawing Figure

U.S. Patent   March 14, 1978   4,079,200
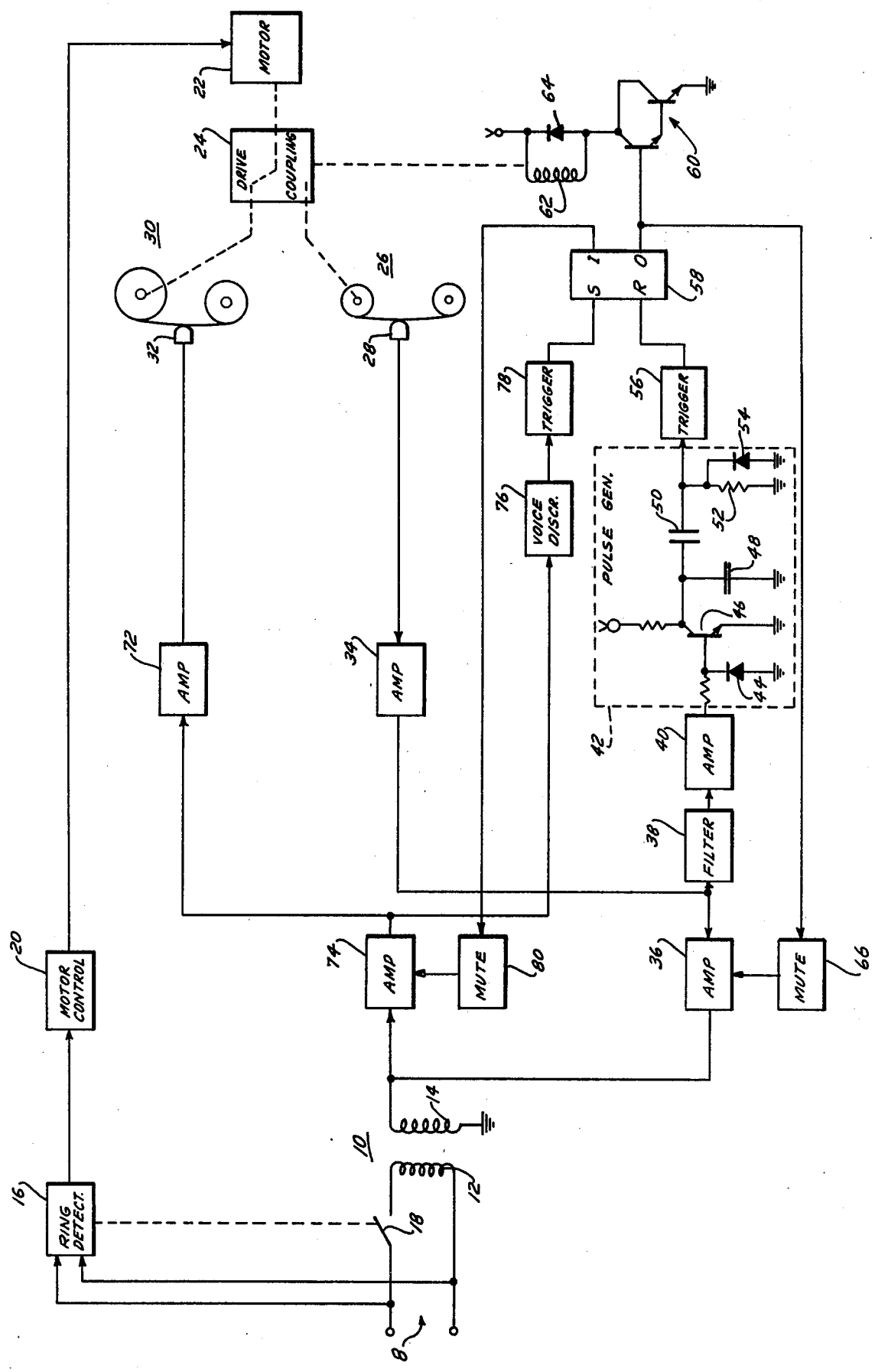

APPARATUS FOR RECORDING REPLIES TO PRE-RECORDED MESSAGES

BACKGROUND OF THE INVENTION

This invention relates to recording/playback apparatus and, more particularly, to such apparatus wherein a pre-recorded message is reproduced and a message in reply thereto is recorded; such apparatus finding ready application in telephone call recording systems.

Many telephone subscribers have found that it is advantageous to employ some means to receive and record telephone messages while absent from the telephone station. Accordingly, there now are available many telephone call recording devices which can be used by a subscriber for both home and business usage. Many of these available recording systems are of the type which permit a single message to be recorded, this message usually being sufficient to apprise a calling party that the telephone station is unattended and that the calling party should recite any desirable message which then is recorded on, for example, a magnetic tape. When in use, these devices permit the subscriber to play back the successive messages which had been recorded from the various calling parties.

The aforedescribed telephone call recording device typically is capable of enabling the subscriber to pre-record a single message which is replayed for each successive calling party. Although satisfactory in many instances for home use, it is preferable to provide successive pre-recorded messages for the purpose of using the device in business establishments. For example, when used by a sales organization, it often is advantageous to pre-record a first message to evoke a first reply which is recorded; and then follow this reply with a second pre-recorded message from which another reply is recorded, and so on. With this format, more uniform and complete information can be elicited from the calling party and recorded. Of course, this modification of the relatively simple telephone call recording device can be employed to great advantage for home use.

In one type of the so-called message/reply telephone call recording device, the user, or telephone subscriber, records a series of messages, or questions, at spaced intervals along the length of a single magnetic tape. Each question or message is allotted a predetermined time interval. Successive messages, or questions, are spaced by other intervals which are adapted to record the successive replies from the calling party. In operation, the first message is transmitted to the calling party in response to the receipt of an incoming telephone call and then the device is switched from a playback mode to a recording mode to permit the calling party's reply to be recorded in the allotted interval. This interval will terminate simultaneously with the movement of the tape to the next pre-recorded message. At that time, the device is switched from its recording mode to its playback mode to permit the next pre-recorded message to be transmitted. At the conclusion of the interval allotted for transmitting this next pre-recorded message, the device again is switched to its recording mode and the next recording time interval is made available for the recording of a reply. This alternate switching between the playback and recording modes for their respective allotted time intervals can continue until the tape is exhausted.

An attendant disadvantage of this type of message/reply telephone call recording device is that if only a single tape is used for the purpose of playing back pre-recorded messages and recording the replies thereto, this tape will satisfy only a single telephone call. That is, the intervals, which are allotted for recording the calling party's reply can receive only the replies from a single calling party. Obviously, if subsequent replies are recorded in these very same intervals, the previous replies will be obliterated.

One solution to this problem is the use of two separate magnetic tapes. One such tape can be used by the subscriber for pre-recording his messages thereon; and the other such tape can be used to record each reply. The first, or so-called message tape, can be an endless tape, whereby the pre-recorded messages are recycled for subsequent playback and transmission. Alternatively, the message tape can be rapidly rewound to its initial, or starting, position, once the last pre-recorded message has been playing back. In either of these formats, the successive messages are made available for re-use at the next incoming telephone call. The second, or so-called reply tape, can be of much greater length so as to have the capacity to record the replies of many different calling parties to the pre-recorded messages.

This use of separate tapes, or media, heretofore has required that each pre-recorded message be recorded in a given time or tape length interval and, similarly, an allotted time or tape length interval is provided for each reply. As an example, each pre-recorded message may be allotted an interval of five seconds, and each replay thereto may be allotted an interval of fifteen seconds. Unfortunately, if the pre-recorded message is very brief, the calling party must listen to a significant period of silence until he is given the opportunity to reply. Conversely, the subscriber must be careful not to record messages which are longer than five seconds. A similar problem exists for the recording of replies. That is, if a relatively brief reply is evoked, then the subscriber, upon playing back the recorded replies, must listen to a relatively large interval of silence until the next reply is reached. Conversely, if the reply is relatively long, it cannot be recorded in its entirety in the allotted interval. Rather, it must be continued in the next interval made available for reply, even though this interval is dedicated to record a reply to a different pre-recorded message. Thus, a significant disadvantage attending this type of telephone call recording device is that a substantial amount of unused portions of message and reply tape often results from brief message and replies. This, of course, is an inefficient use of tape. Another disadvantage is that a reply message can be prematurely cut off merely because its allotted time interval has expired.

OBJECTS OF THE INVENTION

Therefore, it is an object of the present invention to provide an improved recording/playback drive which avoids the problems and disadvantages attending devices of the type noted above.

Another object of this invention is to provide an improved recording/playback apparatus which finds ready application as a telephone call recording device.

A still further object of this invention is to provide an improved telephone call recording device of the type wherein pre-recorded messages are transmitted to a calling party and replies thereto from the calling party are recorded.

A still further object of this invention is to provide an improved telephone call recording device which is automatically switched from a playback mode to a recording mode upon sensing the completion of a prerecorded message, and then is switched back from its recording mode to its playback mode upon sensing the completion of a reply.

Another object of this invention is to provide telephone call recording apparatus of the message/reply type wherein predetermined intervals of time need not be allocated to the message transmissions and reply recording processes.

An additional object of this invention is to provide a method of selectively controlling the operating mode of a telephone call recording device of the message/reply type wherein successive pre-recorded messages are transmitted to a calling party, each message evoking a reply which is recorded.

Still a further object of this invention is to provide a method of controlling a message/reply type of telephone call recording device whereby the device is switched from a message playback mode to a reply recording mode immediately following the completion of each message and reply, respectively.

Various other objects and advantages of the present invention will become readily apparent from the ensuing detailed description, and the novel features will be particularly pointed out in the appended claims.

SUMMARY OF THE INVENTION

In accordance with this invention, a method of and apparatus for playing back pre-recorded messages which have been recorded on a first portion of a magnetic medium and then recording reply information on a second portion of the magnetic medium, successive ones of the pre-recorded messages being separated by detectable indicia, are provided, wherein a pre-recorded message first is played back until the detectable indicia are sensed so as to switch the apparatus from its playback mode to a recording mode; reply information which then is received by the apparatus is recorded on a second portion of the magnetic medium until the completion of the reply information is sensed, whereupon the apparatus is returned from its recording mode to its playback mode so as to resume the playing back of a subsequent message. This switching between playback and record modes continues under the control of the detectable indicia and the completion of reply information. In one embodiment, the invention finds particular application as a telephone call recording device for use at an unattended subscriber's station.

BRIEF DESCRIPTION OF THE DRAWINGS

The following detailed description will best be understood in conjunction with the accompanying drawing which illustrates, in partial schematic and partial block diagram form, one embodiment of the present invention.

DETAILED DESCRIPTION OF A CERTAIN ONE OF THE PREFERRED EMBODIMENTS

For the purpose of the present discussion, it will be assumed that the apparatus illustrated in the drawing is used as a telephone call recording device and is readily adapted to record incoming telephone messages at an unattended subscriber station. However, it should be readily appreciated that the present invention admits of other uses and is not intended to be limited solely to the application of a telephone call recording device. The illustrated apparatus, when used at a telephone subscriber station, is adapted to receive and transmit signals via a telephone line 8. The apparatus is comprised of a magnetic medium upon which prerecorded messages are recorded by conventional techniques. The medium also is adapted to receive incoming information, such as reply messages which are uttered by a calling party. In the illustrated embodiment, the magnetic medium is comprised of a first magnetic tape, such as a conventional tape cassette, an endless loop cartridge, or the like, adapted to be driven by conventional tape driving apparatus, this first tape and its associated driving apparatus being identified by the reference numeral 26. It should be appreciated that the tape driving apparatus includes a reel drive for driving the take-up and, if desired, the supply reels, respectively, together with a capstan for controlling the movement of tape between such reels. This first tape and its associated tape drive mechanism 26 may be considered to be the message tape apparatus. A conventional playback transducer 28 is in contact with the tape so as to reproduce the pre-recorded messages once the tape is moved, as is known by those of ordinary skill in the art.

A similar reply tape and tape drive mechanism 30 are provided so as to record reply information which is transmitted from a calling party. As is shown, a conventional recording transducer 32 is in contact with the reply tape so as to permit such received information to be recorded when the tape is moved therepast.

In order to control the selective movement of the message tape or the reply tape, a controllable electric motor 22 is provided, this motor being mechanically coupled through a selective drive coupling 24 to the respective capstans and/or reel drive members of the message and reply tape drive mechanisms. The motor 22 may be a conventional DC motor adapted to have its speed regulated by a motor control circuit 20. The motor control circuit and electric motor form no part of the present invention per se and are conventional. The selective drive coupling 24 is of the type having a control solenoid therein (not shown) which, depending upon the actuation of the control solenoid, provides a mechanical coupling from the motor 22 either to the message tape drive mechanism 26 or to the reply tape drive mechanism 30. For example, if the control solenoid is de-energized, the mechanical coupling is provided between the motor and the message tape drive mechanism 26. Alternatively, if the control solenoid is actuated, the mechanical coupling is provided between the motor and the reply tape drive mechanism 30. The drive coupling 24 may be of the type having an idler wheel, or the like, which is positionable in two locations whereby the aforenoted couplings are selectively established. The positioning of this idler wheel is determined by the selective actuation of the control solenoid. Of course, alternative selective coupling devices can be provided, if desired. As a still further alternative, individual motors can be mechanically coupled to the respective tape drive mechanisms, and switching devices can be used to selectively energize one or the other of such motors.

The playback transducer 28 is electrically coupled to the telephone line 8 through amplifiers 34 and 36 and through a transformer 10. As shown, the transformer 10 includes a primary winding 12 connected to the telephone line 8 and a secondary winding 14 which is connected to the amplifier 36.

The recording transducer 32 is connected to the secondary winding 14 of the transformer 10 by the cascaded amplifiers 72 and 74, respectively. As shown, the amplifier 36, which may be considered as a transmitting amplifier, is connected in common to the secondary winding 14 with the amplifier 74, the latter being a receiving amplifier. In order to avoid undesired crosstalk between the transmitting and receiving amplifiers and their respective signal channels, muting circuits 66 and 80 are connected to the amplifiers 36 and 74, respectively. The manner in which these muting circuits are controlled will be described hereinbelow.

It is recalled that one advantage of the present invention is the avoidance of allocated intervals of time or tape for pre-recorded messages. This is achieved by providing detectable indicia on the message tape immediately following a message. Such detectable indicia may comprise predetermined signals, or other physical marks placed upon the tape. In a preferred embodiment of the present invention, the detectable indicia are predetermined signals. Such signals are recorded by conventional apparatus forming no part of the present invention. As one example, the message is recorded by using a conventional microphone of the type whereby, once the message is completed, a predetermined tone signal is placed upon the tape immediately following the message information. Of course, if desired, other detectable characteristics of a signal, such as an end of message signal, can be used. Assuming for the purpose of the present discussion that the predetermined signal is a tone signal, the illustrated apparatus is comprised of a tone detector formed of a filter 38, an amplifier 40, a pulse generator 42 and a trigger circuit 56. The filter 38 may comprise a band pass filter having a relatively narrow pass band centered on the frequency of the tone signal. Hence, only the tone signal will be transmitted through the filter, to the exclusion of most of the voice signals which constitute the pre-recorded messages. The output of the filter 38 is connected through the amplifier 40 to the pulse generator 42. The pulse generator is adapted to produce an output pulse once the tone signal terminates. As will soon be described, the purpose of this pulse is to halt the movement of the message tape and to initiate the movement of the reply tape. It should be appreciated that it is preferable to halt the movement of the message tape only after the tone signal has terminated. If the message tape is halted prior to this time and a tone signal of relatively long duration had been recorded, then, upon the subsequent movement of this tape, the remainder of the tone signal may be detected to once again halt the tape, but without the playing back and transmission of a pre-recorded message.

The pulse generator 42 is well-suited to produce an output pulse upon the termination of the tone signal, and the structure of this pulse generator now will be described. A rectifier 44, such as a diode, is connected to the output of the amplifier 40 so as to rectify the tone signal transmitted by the filter 38. This rectified signal is applied to the base of a switching transistor 46 whose collector electrode is connected in a discharge path for a storage capacitor 48. When the transistor 46 is rendered conductive, i.e., it is turned on, the collector-emitter circuit of this transistor forms a discharge path for the capacitor 48. Conversely, when the transistor 46 is turned off, the capacitor 48 is enabled to be charged from a source of energizing potential V through the collector resistors of this transistor. The output of the storage capacitor 48 is connected through a differentiator circuit formed of a capacitor 50 and a resistor 52 to thereby supply an output pulse signal to a trigger circuit 56. A rectifier 54, such as a diode, is provided to supply pulse signals of only a selected polarity to the trigger circuit 56.

In the illustrated pulse generator 42, it is seen that the capacitor 48 initially is charged; and when the tone signal first is transmitted through the filter 38, and rectified by the rectifier 44 to turn on the transistor 46, the capacitor 48 then is discharged. Consequently, a negative pulse is produced by the differentiator circuit formed of the capacitor 50 and the resistor 52; but this negative pulse is effectively shunted by the rectifier 54. Once the tone signal terminates, the transistor 46 is turned off, thereby permitting the storage capacitor 48 to be charged at a relatively rapid rate. This rapid charging of the capacitor results in a positive pulse produced by the differentiator circuit and supplied to the trigger circuit 56.

In an alternative embodiment, the amplifier 40 is of the type which produces an output signal of relatively higher amplitude in the absence of an input signal applied thereto. For example, in this embodiment, the amplifier 40 may comprise a transistor amplifier, an inverting amplifier, or the like. Thus, prior to the transmission of a tone signal through the filter 38, the transistor 46 is turned on to maintain the storage capacitor 48 in a discharged condition. When the tone signal commences, the output of the amplifier 40 exhibits a lower magnitude which is not sufficient to maintain the transistor 46 in its conducting state. Hence, when the transistor 46 turns off, the capacitor 48 is permitted to charge. This charging of the capacitor results in a relatively positive output pulse produced by the differentiator circuit. If desired, this positive output pulse can be prevented from being applied to the trigger circuit 56 by providing a suitable rectifier. For example, the illustrated diode 54 may be poled in the opposite direction. Now, when the tone signal terminates, the amplifier 40 resumes its relatively higher output signal which is capable of turning on the transistor 46 to, in turn, discharge the storage capacitor 48. Hence, a negative pulse is produced by the differentiator circuit and this negative pulse can be applied to the trigger circuit 56.

In view of the foregoing alternative embodiments, it is appreciated that the storage capacitor 48 is adapted to have the charge stored thereon changed in a first direction when a tone signal is detected, and in a second direction when a tone signal terminates. This change in the charge stored on the storage capacitor is used to supply a suitable output pulse to the trigger circuit 56.

A sensing circuit adapted to sense when a reply message has been concluded is connected to the reply message transmission channel which extends between the secondary winding 14 of the transformer 10 and the recording transducer 32. As shown, this sensing circuit comprises a voice discriminator 76 coupled to the amplifier 74, the output of the voice discriminator being connected to a trigger circuit 78. In one embodiment, the voice discriminator 76 includes a timing circuit which is adapted to be energized so as to "time out" within a predetermined time interval following the absence of a voice signal applied to the voice discriminator. Preferably, this timing circuit is of the type which is reset to reinitiate this "time out" interval upon the reception of a voice signal. In this manner, the voice discriminator 76 is capable of distinguishing between mere pauses or gaps in a reply message and the actual conclusion of the reply message. As is appreciated, once the reply message has terminated, no further voice signals will be received to reinitiate, or reset, the time out interval of the timing circuit.

The trigger circuits 56 and 78 may be similar and are adapted to produce output pulses of predetermined duration upon receiving an input signal which exceeds a pre-established threshold. Hence, the trigger circuits are seen to be conventional and may comprise Schmitt trigger circuits, one-shot circuits, or the like. The purpose of the trigger circuits 56 and 78 is to selectively trigger a bistate device 58 into one or the other of its stable states, whereby this bistate device serves to control the drive coupling 24. Accordingly, the bistate device 58 may comprise a conventional bistable multivibrator, or other flip-flop circuits, formed of conventional circuit components, such as cross-coupled transistors, integrated circuits, or relay latching circuits. It will be assumed, for the purpose of this discussion, that the bistate device 58 is a flip-flop circuit exhibiting a first stable state whereby an output signal is produced at its first output terminal, hereinafter the 1 terminal, and a second stable state whereby an output signal is produced at its second output terminal, hereinafter the O terminal. As shown, the 1 terminal is connected to the muting circuit 80 whereby the first output signal is adapted to actuate the muting circuit so as to mute the amplifier 74. Similarly, the O terminal is connected to the muting circuit 66 whereby the second output signal produced by the flip-flop circuit 58 serves to actuate this muting circuit so as to mute the amplifier 36. In addition, the O terminal of the flip-flop circuit 58 is connected to a solenoid drive circuit 60 for the purpose of actuating same, whereby a solenoid coil 62 is energized. As shown, the solenoid drive circuit 60 comprises switchable drive transistors connected in, for example, Darlington relation, the collector-emitter circuit of these transistors being connected in series with a solenoid coil 62 so as to permit current to flow through the solenoid coil when the transistors are turned on. A damping diode 64 is connected in parallel with the solenoid coil 62, as is conventional. Depending upon whether the solenoid coil 62 is energized, the solenoid armature, included in the drive coupling 24, is selectively moved so as to establish the mechanical coupling between the motor 22 and the message tape drive apparatus 56 or the reply tape drive apparatus 30. For the purpose of this discussion, it may be assumed that, when de-energized, the solenoid armature serves to establish the mechanical coupling between the motor 22 and the message tape drive apparatus 26.

Although forming no part of the present invention per se, the drawing illustrates a ring detector circuit 16 connected across the telephone line 8. This ring detector circuit is conventional and is adapted to sense the receipt of an incoming telephone call. This ring detector circuit includes a relay or other switching device capable of closing a normally open armature 18 in the telephone line 8, whereby the telephone line is "seized" when an incoming ringing signal is detected. In addition, the ring detector circuit 16 is connected to the motor control circuit 20 as to initiate the energization of the drive motor 22 once such as incoming telephone call is received.

The operation of the illustrated apparatus now will be described. Preparatory to the use of this apparatus to record reply messages, the user, or telephone subscriber, records the message or series of messages to which he expects a calling party to reply. For example, the first pre-recorded message might be, "What is your name, please?" The next question may be, "Where are you calling from?" Further messages then are recorded depending upon the particular use of this telephone call recording apparatus. After each message is dictated, the aforenoted predetermined signal, is recorded immediately thereafter. The manner in which such signals are recorded forms no part of the present invention per se. Then, once all of the desired messages have been recorded, the message tape is placed in its initial position, such as by rewinding the tape. Also, the reply tape is positioned, or rewound, to its starting location so that there is sufficient capacity to record the reply messages from many calling parties. Assuming that the power source for the apparatus has been turned on, the recording system is conditioned for operation. Thus, the motor 22, although now de-energized, is mechanically coupled through the drive coupling 24 to the message tape drive mechanism 26.

When an incoming telephone call is received, the usual ringing signal is applied to the telephone line 8 and is detected by the ring detector 16. The switching device included in the ring detector serves to close the switch contact 18, whereby the telephone line 8 is seized by the illustrated apparatus. Telephonic communication now can be established between the calling party and the illustrated apparatus.

When the telephone line 8 is seized as aforenoted, the ring detector 16 also actuates the motor control circuit 20, whereby the motor 22 is energized and its speed is properly regulated. Consequently, the motive power imparted by the motor 22 is transmitted through the drive coupling 24 to the message tape drive mechanism 26 so as to advance the message tape past the playback transducer 28. Hence, the pre-recorded message on the message tape is reproduced by the playback transducer 28 and is transmitted through the amplifiers 34 and 36 to the transformer 10 and thence to the calling party via the telephone line 8. At this time, the flip-flop circuit 58 exhibits its first state to thus supply from its 1 terminal the first output signal to the muting circuit 80. Consequently, the pre-recorded message is not returned through the reply message transmission channel formed of the amplifiers 74 and 72.

Once the end of the message has been reached, the prerecorded tone signal is reproduced by the playback transducer 28 and is transmitted through the amplifiers 34 and 36 to the calling party via the telephone line. This apprises the calling party that he now should reply to the just-received message. At the same time, this tone signal is detected by the filter 38 and is transmitted to the pulse generator 42. In the manner described hereinabove, the pulse generator 42 supplies the trigger circuit 56 with a trigger pulse once the tone signal terminates. At that time, the flip-flop circuit 58 is reset to exhibit its second state, and the second output signal is supplied from its O terminal to the muting circuit 56 and to the solenoid drive transistors 60. Consequently, the solenoid coil 62 is energized and the drive coupling 24 is switched so as to now establish a mechanical coupling from the motor 22 to the reply tape drive mechanism 30. Since the mechanical coupling no longer is provided between the motor and the message tape drive mechanism 26, it is appreciated that the message tape stops. Thus, the next pre-recorded message is not capable, at this time, of being reproduced and transmitted to the calling party.

The reply message dictated by the calling party in reply to the pre-recorded message is received and coupled by the secondary winding 14 of the transformer 10 to the amplifier 74. Since the flip-flop circuit 58 has changed its state, the muting circuit 80 now is deactuated, but now the muting circuit 66 is actuated to mute the amplifier 36. Thus, the reply message is transmitted through the amplifier 72 to the recording transducer 32. The movement of the reply tape permits this reply message to be recorded thereon. At the same time, the voice signals which are received from the calling party are monitored by the voice discriminator 76. The timing circuit included in the voice discriminator is initiated to commence its time out operation during each pause in the reply message. However, once the reply message resumes, this timing circuit is reset to await the next pause. Once the reply message is completed, the pause immediately following the completion of this message will, of course, be sufficient to permit the timing circuit to time out. At that time, the trigger circuit 78 supplies a trigger pulse to the flip-flop circuit 58 to restore that flip-flop circuit to its aforementioned first state. It is recognized that, when in this first state, the solenoid drive transistors 60 are turned off, the muting circuit 66 is deactuated and the muting circuit 80 is actuated. Consequently, the solenoid coil 62 is de-energized and the drive coupling 24 re-establishes the mechanical coupling between the motor 22 and the message tape drive mechanism 26. Thus, the next pre-recorded message on the message tape is reproduced and transmitted to the calling party via the telephone line 8. Of course, once the tone signal recorded at the end of this message is detected, the flip-flop circuit 58 changes its state and the solenoid coil 62 is energized to thus switch the mechanical coupling from the message tape drive mechanism to the reply tape drive mechanism. In this mode, the next reply message is recorded on the reply tape. Following the completion of this reply, the voice discriminator 76 senses the absence of voice signals so as to cause the flip-flop circuit 58 once again to change its state. This switching between the playback and recording modes continues until the last pre-recorded message has been transmitted and the reply by the calling party has been recorded. At that time, the message tape is recycled to its start position, as described by way of example hereinbelow, and the illustrated apparatus returns to its initial, or "on-hook" condition, whereupon the switch contact 18 is opened.

Although forming no part of the present invention per se, various techniques can be used to accomplish this "disconnect" from the telephone line. For example, in some telephone systems, a predetermined supervisory signal is transmitted from the telephone central office to the called subscriber station once the calling party has "hung up." This predetermined supervisory signal can be detected and used to de-energize the relay coil included in the ring detector 16 so as to open the switch contact 18. As another alternative, in other telephone systems, dial tone, or a similar signal, is transmitted to the called subscriber station from the telephone central office when the calling party has "hung up." This signal likewise can be detected and used to cause the switch contact 18 to open.

Once the calling party has "hung up," the recording/playback apparatus is prepared for reuse. This can be achieved by continuing the forward movement of the message tape until the end of this tape is reached. Conventional end-of-tape detecting means, not shown, can be used to detect the end of the pre-recorded message tape and then cause the motor control circuit 20 to regulate the motor 22 so as to rewind the message tape to its initial, or starting, position. Alternatively, a predetermined signal or other physical indicia can be placed upon the message tape immediately following the last pre-recorded message. Once this signal or indicium is sensed, the motor control circuit 20 can be conditioned to rewind the message tape once the drive coupling 24 restores the mechanical coupling between the motor 22 and the message tape drive mechanism. It may be recognized that, if the message tape is an endless tape, the aforenoted rewind operation can be omitted. Rather, if the last pre-recorded message is not immediately followed by the first pre-recorded message, this endless tape can be advanced until the first pre-recorded message is reached. Preferably, the subscriber station remains "off-hook" until the recording/playback apparatus is ready for reuse.

While the present invention has been particularly shown and described with reference to one embodiment thereof, it is apparent that various changes and modifications in form and details can be made without departing from the spirit and scope of the invention. For example, although described in the environment of a telephone call message/reply recording system, the illustrated apparatus can be used as, for example, a teaching device. In this alternative application, the message tape can be provided with pre-recorded questions. The reply to each question will be the student's answer. The recording/playback apparatus then will be alternately switched from the playback mode to the recording mode and then back to the playback mode following each pre-recorded question and the student's reply, respectively.

As noted hereinabove, the single motor 22 and switchable drive coupling 24 can be replaced by two individual motors, each being mechanically coupled to an associated tape drive mechanism. The solenoid coil 62 then can be energized so as to selectively actuate one or the other of these motors. Thus, in this alternative embodiment, only one of the message or reply message tapes will be driven at any given time.

As one embodiment thereof, the drive coupling 24 may comprise first and second pinch rollers which are mounted on a movable or pivotal arm. Each pinch roller can be adapted to be urged into contact with the tape drive capstan included in its associated tape drive mechanism. Thus, one of these pinch rollers will be associated with the message tape drive mechanism and the other pinch roller will be associated with the reply message tape drive mechanism. When the solenoid coil 62 is energized, the solenoid causes the arm to move or pivot in a direction so that one of the pinch rollers is urged into contact with its associated capstan, while the other pinch roller is withdrawn from contact with its capstan. Conversely, when the solenoid coil 62 is deenergized, the solenoid is deactuated so as to return the other pinch roller into contact with its capstan while removing the one pinch roller from then contacting its associated capstan. Such switchable drive coupling is conventional and further description thereof need not be provided for a sufficient understanding of the present invention.

Although the magnetic medium upon which the pre-recorded messages are recorded and upon which the reply messages are to be recorded has been described as separate magnetic tapes, it is appreciated that various other recording media can be used. For example, a magnetic sheet can be employed having a first portion for recording the pre-recorded messages and a second portion for recording the reply messages. Other recording media having such first and second portions likewise can be used.

Therefore, it is intended that the appended claims be interpreted as including the foregoing as well as various other changes and modifications in the details of the present invention.

What is claimed is:

1. Apparatus for recording voice signals received from a calling party via a telephone line in reply to the transmission of pre-recorded messages to said calling party via said telephone line, said pre-recorded messages being recorded on a first magnetic tape with successive ones of said pre-recorded messages being separated by a tone signal, and said voice signals received from said calling party being recorded on a second magnetic tape; comprising:

selectively actuable tape drive means for driving said first magnetic tape past a playback transducer whereby said pre-recorded messages and tone signals are reproduced by said playback transducer and for driving said second magnetic tape past a recording transducer whereby voice signals applied to said recording transducer are recorded on said second magnetic tape;

ring detecting means coupled to said telephone line for detecting a ringing signal representing the receipt of an incoming telephone call;

drive selecting means coupled to said tape drive means for normally actuating said tape drive means to drive said first magnetic tape and for selectively actuating said tape drive means to drive said second magnetic tape;

start means coupled to said ring detector means and responsive to a detected ringing signal for starting the operation of said tape drive means;

a voice signal coupling transformer connected to said telephone line for supplying said pre-recorded messages to said telephone line and for receiving said voice signals from said telephone line;

playback amplifying means coupled to said voice signal coupling transformer for receiving said pre-recorded messages reproduced by said playback transducer and for applying said pre-recorded messages to said voice signal coupling transformer;

recording amplifying means coupled to said voice signal coupling transformer for receiving said voice signals from said telephone line and for applying said voice signals to said recording transducer;

a filter coupled to said playback transducer for detecting a tone signal following a pre-recorded message and reproduced from said first magnetic tape by said playback transducer;

pulse generating means coupled to said filter and responsive to said detected tone signal for generating a first pulse;

sensing means coupled to said recording amplifying means and supplied with said voice signals received via said telephone line for sensing when said voice signals have terminated and for generating a second pulse in response thereto;

a flip-flop circuit having a first input connected to said pulse generating means and a second input connected to said sensing means, said flip-flop circuit being triggered to a first state in response to said first pulse and to a second state in response to said second pulse;

drive control means coupled to said flip-flop circuit and responsive to said first state for controlling said drive selecting means to actuate said tape drive means such that said first magnetic tape is stopped and said second magnetic tape is driven, and responsive to said second state for controlling said drive selecting means to actuate said tape drive means such that said second tape is stopped and said first tape is driven;

playback muting means coupled to said playback amplifying means and responsive to said first state of said flip-flop circuit for muting said playback amplifying means; and recording muting means coupled to said recording amplifying means and responsive to said second state of said flip-flop circuit for muting said recording amplifying means.

2. The apparatus of claim 1 wherein said pulse generating means comprises a storage capacitor; a transistor whose collector-emitter circuit is connected in a discharge path coupled to said storage capacitor; a source of charging voltage coupled to said storage capacitor; a rectifier coupled to said transistor for supplying a rectified version of detected tone signals to said transistor, thereby said transistor conductive so as to discharge said storage capacitor, said storage capacitor being charged by said source of charging voltage when said transistor is rendered non-conductive; and a differentiator circuit coupled to said storage capacitor for selectively generating pulses when said storage capacitor is discharged or charged.

3. The apparatus of claim 1 wherein said pulse generating means comprises a storage capacitor; a transistor whose collector-emitter circuit is connected in a discharge path to said storage capacitor, said transistor normally being conductive so as to maintain said storage capacitor in a discharge condition; a source of charging voltage coupled to said storage capacitor; means for rendering said transistor nonconductive when said tone signals are detected, such that said storage capacitor is charged; and a differentiator circuit coupled to said storage capacitor for selectively generating pulses when said storage capacitor is charged or discharged.

* * * * *